Oct. 8, 1968    A. S. CZUBAK    3,405,049
CYLINDRICAL BORE SIZING AND FINISHING DEVICE
Filed Oct. 27, 1964    4 Sheets-Sheet 3
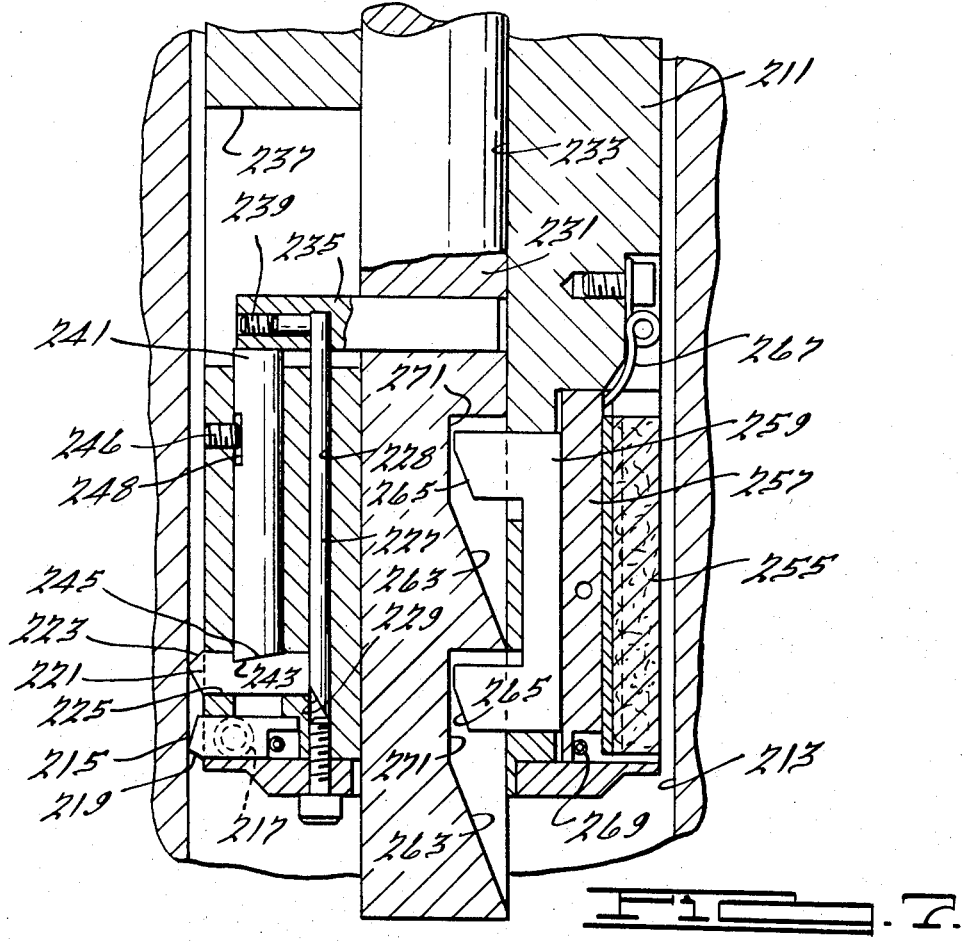
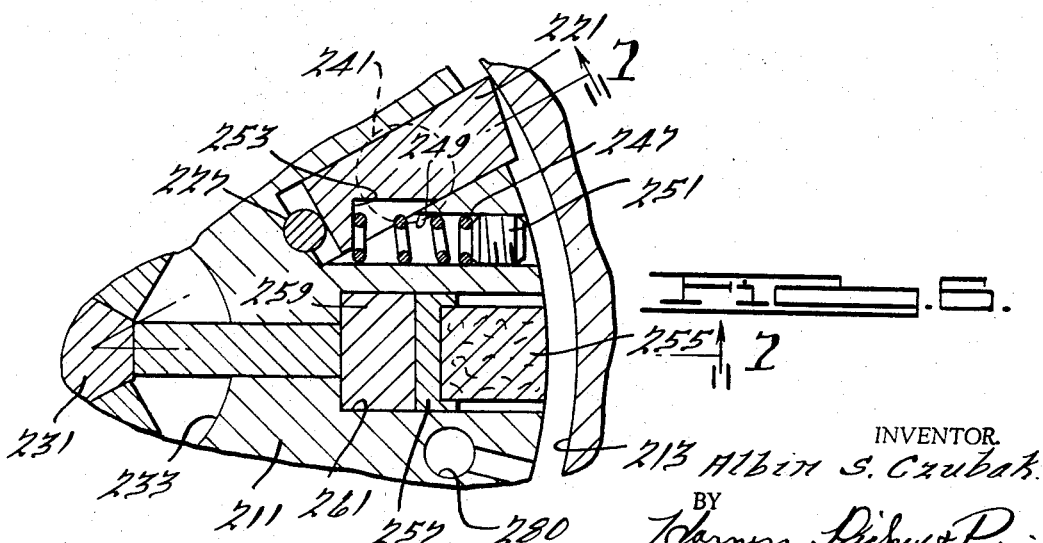
INVENTOR.
Albin S. Czubak
BY
Harness, Dickey & Pierce
ATTORNEYS

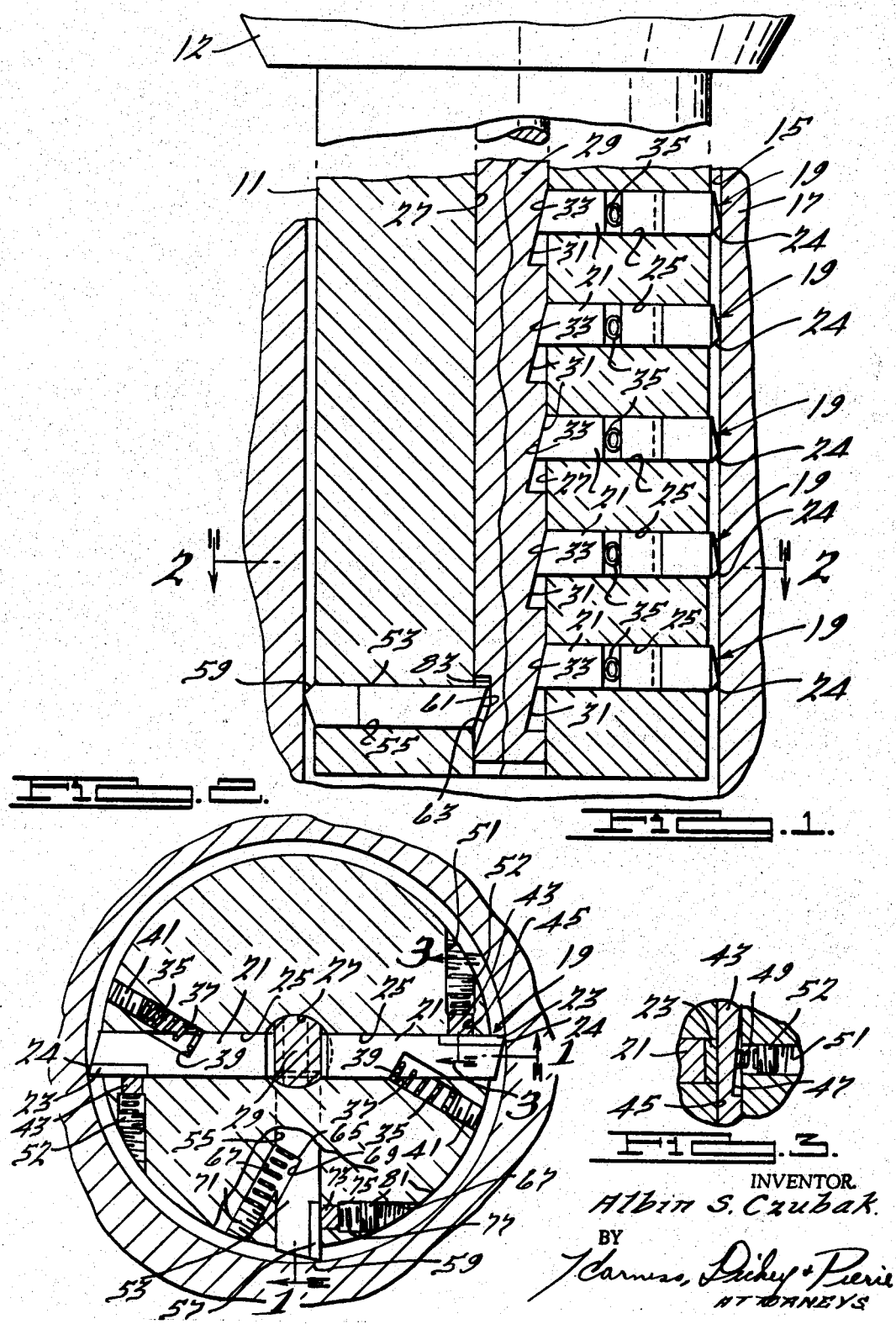

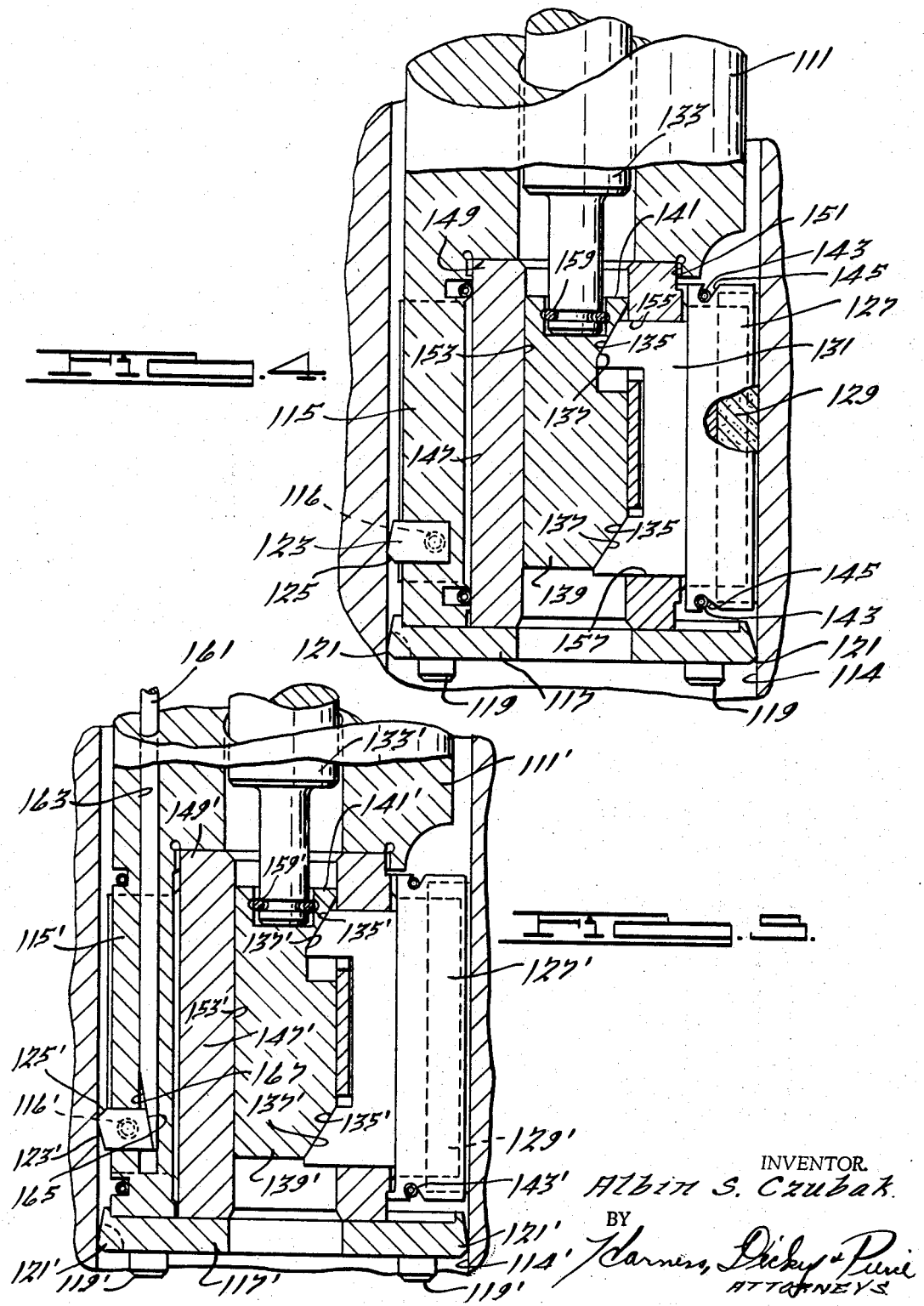

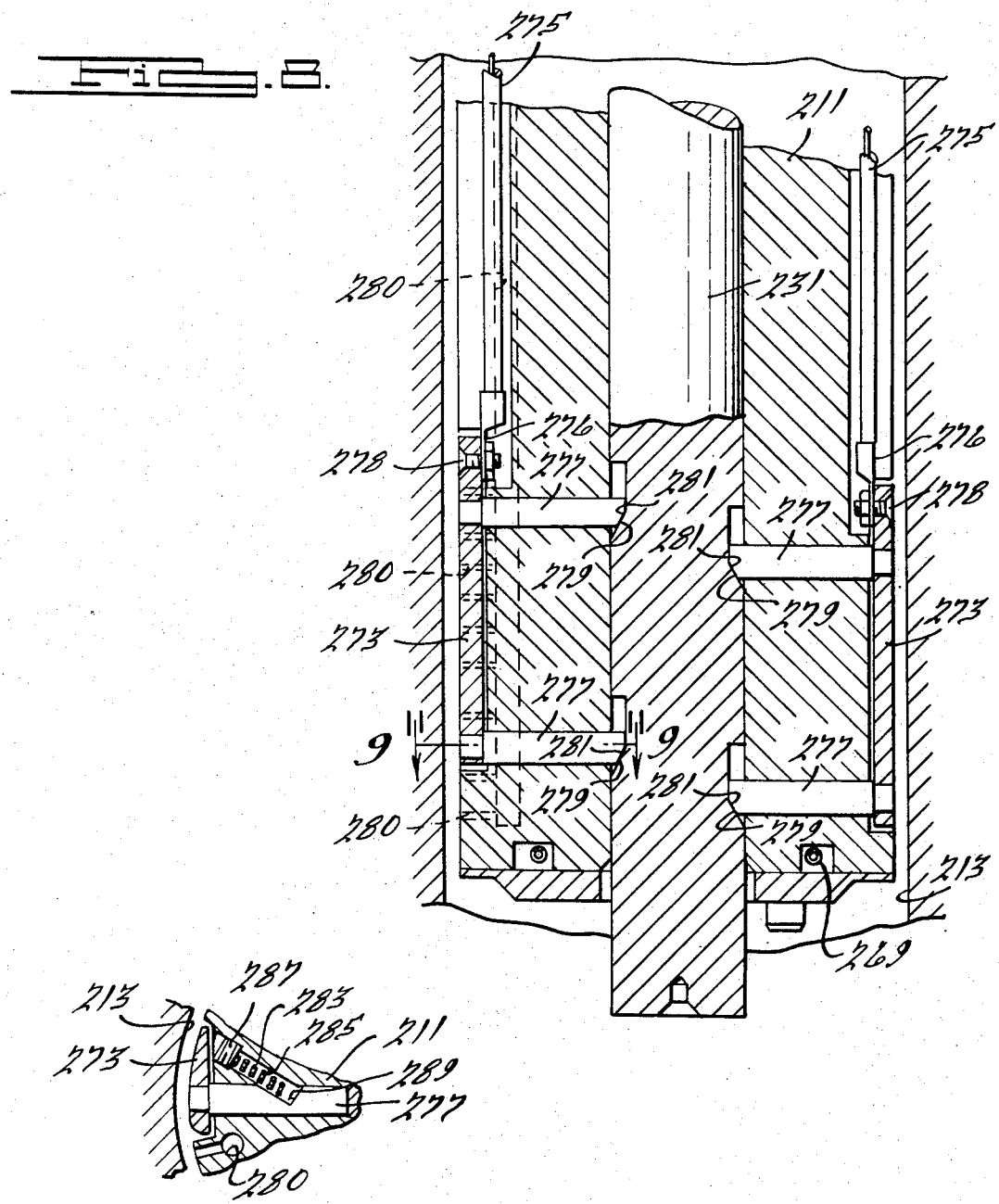

United States Patent Office 3,405,049
Patented Oct. 8, 1968

3,405,049
CYLINDRICAL BORE SIZING AND FINISHING DEVICE
Albin S. Czubak, Detroit, Mich., assignor to Micromatic Hone Corporation, Detroit, Mich., a corporation of Michigan
Filed Oct. 27, 1964, Ser. No. 406,844
17 Claims. (Cl. 204—217)

ABSTRACT OF THE DISCLOSURE

A rotary boring tool including a plurality of cutting tools for performing different cutting operations on a single tool spindle.

---

This invention relates generally to rotary boring tools, and particularly to an expandable type rotating and reciprocating tool assembly adapted to both enlarge and finish cylindrical bores.

In the typical boring operation where a generally cylindrical bore is to be sized and finished to close tolerances, the bore is first enlarged or roughed out slightly under size by a roughing cutter. A finishing cutter designed to remove a relatively small amount of stock may be used to accurately size the workpiece bore. If desired, a honing tool is then used to finish the bore to a high degree of precision and impart a desired surface finish to the bore wall.

In the past, these machining operations were usually performed by separate tools at different tool stations, the workpieces being fed successively from station to station. However, since each of these operating stations requires its own equipment, the initial investment, operational cost, repairs, etc., on the apparatus causes the overall production cost to be undesirably high. Thus, a considerable reduction in cost can be effected by performing these tooling operations at one tool station and in a single tool cycle.

The present invention is directed to providing a bore sizing and finishing tool assembly of the aforementioned type wherein successive cylindrical workpiece bores may be roughed and finished, and, if desired, honed in one continuous operation at a single tool station. Briefly, the present invention includes a boring tool spindle adapted to be rotated about a longitudinal axis and reciprocated therealong during the machining operation. The roughing and finishing tools are disposed about the spindle periphery, some of which may be fixed thereto and others expandable outwardly thereof by a reciprocable cone assembly. If desired, honing tools may also be carried by the spindle and expandable relative thereto by selective operation of the cone assembly. Thus, by properly designing and controlling the movement of the cone assembly, the tools including the roughening, finishing and, if desired, the honing tools disposed on the tool spindle will be sequentially actuated in a predetermined sequence to rough out, finish and hone the cylindrical bore.

It is therefore an object of the present invention to provide an improved bore sizing and finishing apparatus capable of sizing and finishing a cylindrical bore at a single tool station.

It is a further object of the present invention to provide an improved cylindrical bore sizing and finishing apparatus of the above type wherein a variety of bore sizing and finishing tools may be carried by a single spindle.

It is a further object of the present invention to provide an improved cylindrical bore sizing and finishing apparatus of the above type wherein the sizing and finishing tools may be selectively actuated according to a predetermined sequence without interrupting spindle cycling.

It is a further object of the present invention to provide an improved cylindrical bore sizing and finishing apparatus of the above type wherein the machining operation may be performed automatically upon a series of workpieces and may be controlled from a single source.

It is a further object of the present invention to provide an improved cylindrical bore sizing and finishing apparatus of the above type which is relatively inexpensive to manufacture, rugged in construction and reliable in operation.

Further objects and advantages of the present invention will become more apparent from the following detained description taken in conjunction with the drawings in which:

FIGURE 1 is a vertical sectional view of a bore sizing and finishing tool constructed according to the principles of the present invention and taken along the line 1—1 of FIG. 2;

FIG. 2 is a sectional view of the structure of FIG. 1 taken along the line 2—2 thereof;

FIG. 3 is a fragmentary sectional view of the structure of FIG. 2 taken along the line 3—3 thereof;

FIG. 4 is a vertical sectional view of a modified device which includes a honing tool assembly;

FIG. 5 is a vertical sectional view of a further modified form of the present invention;

FIG. 6 is a horizontal sectional view of another modification of the present invention which utilizes an electrolytic assist in honing;

FIG. 7 is a sectional view of the structure of FIG. 6 taken along the line 7—7 thereof;

FIG. 8 is a sectional view of the structure of FIG. 6 similar to FIG. 7 but showing the electrolytic plates; and FIG. 9 is a sectional view of the structure of FIG. 8 taken along the line 9—9 thereof.

Referring now more specifically to the drawings and particularly FIGS. 1–3, one form of boring tool constructed according to the principles of the present invention is seen to include a tool spindle 11 adapted to be connected at one end to an output member 12 of a suitable rotating and reciprocating drive source (not shown) in the usual manner. The spindle 11 therefore is adapted to rotate about and reciprocate axially along a longitudinally extending axis thereof and within a generally cylindrical bore 15 formed in a workpiece 17.

The tool spindle has one or a plurality of axially spaced aligned banks of rough boring cutters indicated generally at 19 and disposed radially thereof. Each bank 19 of cutters may include one or more tool holders 21 each having a cutting tool 23 suitably fixed thereto and disposed for slidable movement therewith within radially extending and axially aligned openings 25 formed in the spindle. In the device illustrated, each bank 19 includes a set of two tools, although it is to be understood that as little as one or as many as four tools may be included in each bank. The tools 23 are each, in turn, provided with a cutting edge 24.

An axially extending bore 27, formed centrally in the spindle, communicates with each of the radial openings 25 and has an expanding rod 29 slidably disposed thereon. One end of the expanding rod 29 may be suitably attached to a controlled reciprocating power source (not shown) to reciprocate the rod relative to the spindle 11. The rod 29 is formed along its length and adjacent each of the tool holders 21 with a tapered surface 31 adapted to engage a complementary tapered surface 33 formed on the tool holders. Thus, as the rod 29 is moved in a downward axial direction as viewed in FIG. 1, each of the roughing tools and tool holders are moved radially outwardly of the spindle, the degree of this movement being a function of the angle of the tapers 31 and 33 and the extent of expanding rod movement. A plurality of compression springs 35 are positioned within openings 37 in the spindle and each has a portion thereof engaging a recess 39 formed in a respective one of the tool holders 21. Thus, as the expanding rod 29 is moved in an upward axial direction, the springs 35 bias the tool holders 21 radially inwardly of the spindle 11. A set screw 41 is threadedly received in each of the openings 37 to maintain springs 35 therein.

In operation, the spindle 11 is first positioned within the workpiece bore 15 and the expanding rod 29 is moved in a downward axial direction relative to the spindle to expand the tool holders 21 radially outwardly a predetermined extent. Thereafter, the spindle 11 is rotated and moved axially within the workpiece bore 15 with the cutting edges 24 of the roughing tools removing a predetermined amount of stock therefrom. The extent of spindle reciprocation within the workpiece is determined by the distance between the cutter banks 19.

During this rough boring operation, radial and torsional rotational forces are developed and generated back upon the tools 23 and their respective holders 21. The walls of the radial openings 25 in the spindle 11 receiving the tool holders 21 absorb the torsional forces; however, in order to prevent the radial forces from being directed through the holders 21 and upon the tapered surfaces 31, a releasable tool clamping device is provided to lock the tools in their expanded positions. As shown in FIGS. 2 and 3, this clamping device includes an elongated rod 43 disposed for sliding movement in an opening 45 formed axially of the spindle 11 and adjacent each axial row of radially extending openings 25. Each of the rods 43 is positioned to slidably engage the tool holders 21 and is formed with a longitudinally tapered surface 47 in the area of each bank of tools 19 and which is positioned on the opposite side thereof from the tools. A plurality of compression springs 49 are positioned one in each of a plurality of threaded openings 51 formed in the spindle 11 opposite each radial opening 25 and are retained therein by set screws 52. The springs 49 are positioned to engage the rods 43 in the vicinity of the tapered surfaces 47 and as the rods 43 are advanced axially within the spindle 11, the tapered surfaces 47 progressively move past the springs 49 thereby increasing the force generated by the springs against the rods 43 and the contact force between the rods 43 and the tool holders 21 until the tool holders are locked against movement radially inward of the spindle. When it is desired to retract or readjust the roughing tools and tool holders, the rods 43 are simply retracted axially of the spindle 11 thereby permitting free radial movement of the tool holders.

In practice, the tool locking rods 43 may be operatively connected to the expanding rod 29 or may be independently controlled as desired. However, the wedge spring connection herein provided permits direct connection between the expanding rod 29 and the rods 43, since the tool holders can be locked in a predetermined range of expanding rod positions by proper design of the tapered surface 47 and the spring 49.

After completion of the rough boring stroke, which includes positioning the tool spindle within the bore, expanding the rough boring tools radially outwardly, and rotating and moving the tool spindle axially a distance equal to the spacing between the rough boring tool banks 19, the rough boring tools are retracted radially inwardly of the spindle 11 and a finish boring tool carried by the spindle is expanded radially outwardly thereof to finish bore the workpiece. The finish boring tool is seen to include preferably a single tool holder 53 carried by the spindle 11 in a generally radially extending opening 55 disposed adjacent the end of the spindle remote from the drive source output member 12. The finishing tool holder is slidably disposed in the opening 55 and is spaced angularly from the rough boring tools. A finish boring tool 57 having a cutting edge 59 directed opposite the rough boring cutting edges 24 is suitably retained on each tool holder 53. The radial inward portion of the tool holder is formed with a tapered surface 61 adapted to be engaged by a correspondingly tapered surface 63 formed on the expanding rod 29. As shown in FIG. 1, movement of the rod 29 in an upward axial direction will cause radial expansion of the finish boring tool 57, this being opposite the direction of movement of the expanding rod 29 to radially expand the rough boring tools 23. A compression spring 65 is positioned within a bore 67 formed in the spindle 11 and has one end in engagement with a slot 69 formed in the finish boring tool holder 53 to normally bias the finish boring tool holder radially inwardly. A set screw 71 maintains the spring 65 within the bore 67. Thus, after the rough boring stroke is completed, the expanding rod 29 is moved in an upward axial direction thereby permitting retraction of the rough boring tools and causing expansion of the finish boring tool. The tool spindle 11 continues rotation but is moved axially out of the bore 15 during which time the cutting edge 59 finish bores by removing a predetermined amount of stock from the bore. Thus, the workpiece is sized and finished accurately at a single tool station and in one operation which represents a material reduction in time, space and equipment needed and therefore a reduction in the product cost to the consumer.

The rough boring tool holders are designed so that engagement between the tapered surfaces 31 and 33 of the expanding rod 29 and rough boring tool holder, respectively, expands the rough boring tools radially outwardly to the desired extent. Similarly, the finish boring tool holder is designed so that engagement between the tapered surfaces 61 and 63 expands the finish boring tool radially outwardly the desired extent which is, generally, slightly beyond the extent of radial expansion of the rough boring tools.

As in the rough boring tools, a locking rod 73 may be provided for the finish boring tool and is formed with a tapered surface 75 adapted to engage a wedge spring 77 retained in a bore 79 by a set screw 81. Thus, axial movement of the rod 73 permits the finish boring tool to be locked in its expanded position in the same manner as the locking rod 43 for the rough boring tools. This locking rod 73 may also be directly connected to the expanding rod 29 or may be separately motivated by a control means (not shown).

In order to permit retraction of both the rough and finish boring tools and radial movement of the rough boring tools independently of the finish boring tool, expanding rod 29 is formed with an axially extending recessed portion 83 adjacent the tapered surface 63. Thus, movement of the expanding rod 29 to its most downward axial position as viewed in FIG. 1 expands the rough boring tools radially outwardly but has no effect on the retracted finish boring tool. As the expanding rod 29 is moved in an upward axial direction, the rough boring tools contract radially inwardly, through action of the springs 35 and it is not until the rod 29 is moved to its upward axial limit that the finish boring tool 57 is expanded. In the intermediate expanding rod position, both the rough and finish boring tools are in their retracted positions.

Another embodiment of the invention is shown in FIG. 4 and is adapted to rough, finish bore and hone a cylindrical bore all in one operation. This device is seen to include a hollow tool spindle 111 adapted to be connected at one end to a rotating and reciprocating drive source (not shown) in the usual manner for rotation and axial reciprocation relative to a longitudinal axis thereof and within a cylindrical workpiece bore 114. The other end of the spindle is formed with spaced axially extending fork positions 115 to the end of which is fixed a fly cutter assembly 117 by a plurality of screws 119. The fly cutter assembly includes a plurality of spaced radially disposed cutting edges 121 adapted to rough bore the cylindrical workpiece bore 114 during a cutting pass therethrough.

A finish boring tool 123 is fixedly mounted on one of the forks 115 behind the fly cutter assembly by suitable means such as a screw 116. The finish boring tool 123 is provided with a cutting edge 125 positioned radially outwardly, to a relatively small extent, of the cutting edges 121. Thus, during a single pass of the tool spindle 111, the cylindrical bore 114 is roughed out and finished by the cutting edges 121 and 125 of the tools 117 and 123, respectively.

A honing tool assembly also is carried by the spindle 111 in the area of the forks 115 and is seen to include a plurality of honing tool holders 127 each of which carries a honing stone 129 in the usual manner. Each of the holders 127 is fixed to an expansion plate 131 adapted to be displaced radially of the spindle axis by axial displacement of an expanding rod 133. Thus, the expansion plates 131 are each formed with tapered surfaces 135 positioned to engage complementary tapered surfaces 137 on an expanding cone 139. As shown, the cone 139 is disposed for axial movement within the spindle fork portion and is provided with a head portion 141 receiving the expanding rod 133 for axial movement therewith. The expanding rod 133, in turn, is adapted to be connected to a suitable reciprocating drive source (not shown). Therefore, reciprocation of the expanding rod 133 in a downward axial direction within the spindle 111 causes the honing tool holders and honing stones to be expanded radially outwardly of the spindle, the extent of expansion being a function of the angle of the tapered surfaces 135 and 137 and the extent of expanding rod movement.

Upon completion of the honing operation, the expanding rod 133 and cone 139 is moved in an upward axial direction within the spindle 111 whereupon a pair of conventional garter springs 143 mounted in slots 145 formed in each end of the expansion plates 131 contract these plates and the stones and stone holders radially inwardly.

The typical honing operation is employed when surface finish and dimensional accuracy of the workpiece are highly critical. Thus, it is of the utmost importance that the honing assembly be accurately directed through the workpiece during the honing cycle. However, quite often the machine spindle and the workpiece bore become misaligned and in order to permit the honing operation to proceed without serious impairment to either the tool drive or the finished workpiece, the honing assembly of the device of FIG. 4 is permitted limited lateral movement. Thus, as shown in FIG. 4, a floating member in the form of a tubular body 147 has one end portion 149 received in a counterbore 151 formed in spindle 111. This end portion 149 has an outer diameter smaller than the counterbore diameter to permit limited lateral displacement of the tube relative to the spindle.

The tubular body 147 has an inner generally cylindrical wall portion 153 adapted to snugly but slidably receive and guide the cone 139. Also, as shown, tubular body 147 is provided with radial openings 155 and 157 to receive and guide the radial movement of the expansion plates 131. The connection between the expanding rod 133 and the head portion 141 of cone 139 may be of the universal type as at 159 permitting limited lateral movement therebetween. Thus, if a small misalignment exists between the spindle and workpiece resulting from spindle warpage, etc., the tubular body 147 is shifted laterally when the stones 129 are expanded into contact with the bore wall 114 by a reaction force directed through the honing tools. The cone 139 is also shifted laterally relative to the rod 133, this being permissible because of the universal connection 159. Additionally, the radial deflection of the stones 129 is automatically adjusted since the cone 139 shifts laterally with the tubular body 147.

In operation, the spindle 111 is rotated and axially displaced within the generally cylindrical bore 114. The roughing and finishing cutters 121 and 125, respectively, will rough out and finish the bore 114 on a single spindle pass as described above. The expanding rod 133 is then displaced in a downward axial direction relative to the tool spindle 111 to expand the stones 129 and the spindle is then cycled through a typical honing operation. Thereafter, the rod 133 is moved in an upward axial direction to permit the stones to collapse through springs 143.

The boring and honing device shown in the modification of FIG. 5 is generally the same as that shown in FIG. 4 and described hereinabove in both construction and operation. For this reason, a detailed description of this modification is omitted here. The reference numerals in FIG. 5 correspond to the reference numerals of FIG. 4 except that in FIG. 5 the numerals are primed. The sole exception to identity between the devices of FIGS. 4 and 5 is that of the finish boring tool. As shown in FIG. 5, the finish boring tool $123^1$ is disposed for rotation and reciprocation with the tool spindle $111^1$ but has its cutting edge $125^1$ directed opposite the cutting edges $121^1$ on the multiple fly cutter $117^1$. Additionally, the tool $123^1$ is mounted for limited radial movement relative to the spindle $111^1$. Thus, in contrast with the device of FIG. 4, this modification rough bores on one spindle pass and finish bores on the return pass. Thereafter, the honing stones are expanded in the same fashion as in the device of FIG. 4 and the spindle $111^1$ may be reciprocated through a typical honing cycle.

The structure for expanding the finish boring tool $123^1$ into the boring position is seen to include an expanding blade 161 slidable axially of the spindle $111^1$ in an opening 163 formed therein. The finish boring tool $123^1$ is formed with a tapered surface 165 positioned to engage a correspondingly tapered surface 167 on the blade 161. Thus, movement of the blade 161 in a downward axial direction expands the tool $123^1$ radially outwardly of the spindle $111^1$, the extent of this movement being a function of the tapers 165 and 167 and the extent of movement of the blade 161. The finish boring tool $123^1$ may be locked in its expanded position by a wedge locking device and may be spring retracted upon release of the expanding blade 161 as were the boring tools of the device of FIGS. 1–3. Further, the control means for reciprocating the expanding blade 161 relative to the tool spindle $111^1$ may be the same as that for reciprocating the honing tool expanding rod $133^1$ or the two may be separately actuated control means.

A further modification adapted to rough and finish bore and hone a cylindrical bore in one operation is illustrated in FIGS. 6–9 and is seen to include a hollow tool spindle 211 adapted to be connected at one end to a roating and reciprocating power source (not shown) in the usual manner. This spindle carries both rough and finish boring tools as well as a honing stone assembly as shown in FIGS. 6 and 7 and is adapted to be rotated and axially reciprocated within a generally cylindrical workpiece bore 213.

The spindle 211 is seen to be provided with a plurality of circumferentially spaced rough boring tools 215 adjustably fixed thereto by suitable means such as set screws 217. Each of the tools 215 is provided with a cutting edge 219 adapted to remove a predetermined amount of stock from the bore 213 during a cutting pass.

Behind the rough boring tools on the spindle 211 is a finish boring tool 221 disposed for limited radial movement relative to the spindle. This finish boring tool has a cutting edge 223 directed rearwardly of the cutting edges 219 of the rough boring tools and is slidably disposed within a generally radially extending bore 225 formed in the spindle 211. A tool expanding blade 227 is slidably disposed in an axially extending opening 228 formed in the spindle 211 and is provided with a tapered surface 229 adapted to engage the radial inward portion of the finish boring tool 221 which may or may not be tapered complementary to the taper 229, as desired. Thus, as the expanding blade 227 is moved in a downward axial direction, the finish boring tool is expanded radially outwardly a distance determined in this instance solely by the taper 229.

To reciprocate the expanding blade 227, an expanding cone rod 231 is provided and is slidably disposed for axial movement along a bore 233 formed centrally of the spindle 211. A cone pin 235 is suitably fixed to the cone rod 231 and extends radially thereof into an opening 237 formed in the spindle 211. The expanding blade 227 is fixed to the cone pin 235 by suitable means such as a screw 239. The cone rod 231 is, in turn, adapted to be secured to a conventional reciprocating power source (not shown) mounted on the machine frame to reciprocate the cone rod 231 and the expanding blade 227 relative to the spindle 211. A wedge locking rod 241 is positioned to abut the cone pin 235 when the cone pin is moved downwardly as viewed in FIG. 7. The rod 241 is provided with a tapered surface 243 adapted to engage a corresponding tapered surface 245 formed on the finish boring tool and its axial movement is limited by a screw 246 received within a slot 248. Thus, movement of the cone rod 231 is a downward direction as viewed in FIG. 7 displaces the finish boring tool 221 radially outwardly of the spindle 211 while at the same time the pin 235 moves the surface 243 of the locking rod 241 into locking engagement with the surface 245 of the tool 221. Upon movement of the cone rod 231 in an upward axial direction, the pin 235 is released from the locking rod 241 and the finish boring tool 221 is retracted radially inwardly by a compression spring 247 retained in a bore 249 in the spindle 211 by a set screw 251 and having an end portion thereof engaging a slot 253 in the tool 221.

The tool spindle 211 is also disposed to carry a honing tool assembly thereon adjacent the boring tools described above. This honing tool assembly is seen to include a plurality of honing stones 255 fixedly carried by tool holders 257 each in turn suitably fixed to an expanding plate 259. These honing tool assemblies may be spaced equally around the tool spindle 211 and are disposed for limited radial movement relative thereto in suitably formed openings 261.

To expand the honing tool assemblies radially of the tool spindle, the cone rod 231 is formed with conical tapered surfaces 263 each adapted to engage correspondingly tapered surfaces 265 on each of the expanding plates 259. Thus, by moving the cone rod 231 in an upward axial direction, the expanding plates 259 are displaced radially outwardly to an extent which is a function of the tapers 263 and 265 and the extent of movement of the cone rod 231. Movement of the cone rod 231 in a downward axial direction permits the honing tool assemblies to contract radially inwardly under the force of springs 267 and 269 engaging the tool holders 257.

The cone rod 231 is designed to permit expansion of the finish boring tool or the honing tool assemblies, depending on the direction of movement thereof relative to the spindle, with an intermediate cone rod position allowing both the finish boring tool and honing tool assemblies to be retracted. Thus, an axially extending slot 271 is formed rearwardly of the tapes 263 on the cone rod 231 to freely receive the expanding plate taper portions 265.

The honing tool assembly of FIGS. 6–9 may incorporate the use of an electrolytic assist in honing the cylindrical bore 213. Thus, as shown in FIGS. 8 and 9, contoured electroplates 273 having suitable electric wires 275 provided with terminals 276 attached thereto by screws 278 and to a source of electric current (not shown) may be disposed in spaced circumferential relation on the spindle 211. When using this electrolytic assist, fluid is dispersed through the spindle 211 to the workpiece bore 213 through fluid distributing openings 280. A pair of expanding pins 277 are attached at one end to each electroplate 273. The other end of each of the pins 277 may be formed with a tapered surface 279 positioned to engage correspondingly tapered surfaces 281 on the cone rod 231. Thus, movement of the cone rod 231 is an upward axial direction in this device expands both the honing tools and the electroplates. To retract the electroplates upon downward axial movement of the cone rod 231, suitable compression springs 283 are provided in bores 285 formed in the spindle 211. Each spring is retained in its respective bore by a setscrew 287 and has an end portion thereof engaging a slot 289 formed in a respective one of the expanding pins 277.

In use, the spindle 211 is rotated and passed through the bore 213 to rough out the bore to size. Thereafter, the cone rod 231 is moved in a downward axial direction to expand and lock the finish boring tool 221 and the spindle 211 is rotated and moved axially out of the bore 213 to carry out the finish boring operation. The cone rod 231 is then moved in an upward axial direction to expand the honing tool assemblies and, if desired, the electroplates radially outwardly and the spindle is rotated and reciprocated through a typical honing cycle. Upon completion of the honing cycle, the cone rod is moved to its intermediate position with the honing tool assemblies and electroplates collapsing under spring force.

Thus, it can readily be seen that by the present invention there has been provided an improved cylindrical bore finishing device capable of rough and finish boring and, if desired, honing the bore in one operation. Although several modifications of the present invention have been illustrated and described in detail hereinabove, it will be understood that various additions, substitutions, modifications and omissions may be made thereto without departing from the spirit of the invention as encompassed by the appended claims.

What is claimed is:

1. A cylindrical bore finishing device including
    a rotatable and reciprocable tool spindle adapted for movement within said bore,
    a plurality of cutting tools carried by said spindle in spaced circumferential relation for movement therewith,
    expander cone means adapted to expand said cutting tools outwardly of said spindle upon movement in a first direction whereby said first cutting tools will approximately size said bore in their movement therethrough,
    at least one finishing cutting tool carried by said spindle for movement therewith and expandable outwardly thereof upon movement of said expander cone in a second direction,
    said finishing cutting tool adapted to accurately size said bore in its movement therethrough,
    whereby said bore will be finished to size during a single tool cycle.

2. A cylindrical bore finishing device including
    a rotatable and reciprocable tool spindle adapted for movement wtihin said bore,
    a plurality of cutting tools carried by said spindle in spaced circumferential relation for movement therewith and adapted to approximately size said bore during movement of said spindle in a first axial direction,
    expander cone means adapted to expand said cutting tools outwardly of said spindle upon movement in a first direction,
    at least one finishing cutting tool carried by said spindle for movement therewith and expandable outwardly thereof upon movement of said expander cone in a second direction,
    said finishing cutting tool adapted to accurately size said bore during movement of said spindle in a second axial direction,
    whereby said bore will be finished to size during a single tool cycle.

3. A cylindrical bore finishing device including
    a rotatable and reciprocable tool spindle adapted for movement within said bore, a plurality of axially spaced cutting tools carried by
said spindle at diametrically opposite points thereof
for movement therewith, expander cone means adapted to expand said cutting
tools outwardly of said spindle upon movement in
a first direction whereby said first cutting tools will
approximately size said bore in their movement
therethrough, at least one finishing cutting tool carried by said
spindle for movement therewith and expandable outwardly thereof upon movement of said expander
cone in a second direction, said finishing cutting tool adapted to accurately size
said bore in its movement therethrough, whereby said bore will be finished to size during a
single tool cycle.

4. A cylindrical bore finishing device including
a rotatable and reciprocable tool spindle adapted for
movement within said bore,
a plurality of axially spaced cutting tools carried by said
spindle at diametrically opposite points thereof for
movement therewith and adapted to approximately
size said bore during movement of said spindle in
a first axial direction,
expander cone means adapted to expand said cutting
tools outwardly of said spindle upon movement in a
first direction,
at least one finishing cutting tool carried by said spindle
for movement therewith and expandable outwardly
thereof upon movement of said expander cone in a
second direction,
said finishing cutting tool adapted to accurately size
said bore during movement of said spindle in a second axial direction,
whereby said bore will be finished to size during a single
tool cycle.

5. A cylindrical bore finishing device including
a rotatable and reciprocable tool spindle adapted for
movement within said bore,
a plurality of circumferentially spaced cutting tools
fixed to said spindle and adapted to approximately
size said bore in their movement therethrough,
at least one finish cutting tool carried by said spindle
and radially movable relative thereto,
resilient means normally biasing said finish cutting tool
radially inwardly of said spindle,
means for moving said finish cutting tool outwardly of
said spindle against said resilient means to accurately
size said bore subsequent to said approximate sizing
operation,
a plurality of honing stone assemblies carried by said
spindle for movement therewith,
expander cone means adapted to expand said honing
stones outwardly of said spindle upon movement
thereof in a given direction longitudinally of said
spindle,
said cone being movable in said direction subsequent
to said finish cutting operation
whereby said bore can be sized and finished by a single
tool spindle.

6. A cylindrical bore finishing device including
a rotatable and reciprocable tool spindle adapted for
movement within said bore,
a plurality of circumferentially spaced cutting tools
fixed to said spindle and adapted to approximately
size said bore during movement of said spindle in
a first direction longitudinally of said bore,
at least one finish cutting tool carried by said spindle
for movement therewith and radially movable relative thereto,
resilient means normally biasing said finish cutting
tool radially inwardly of said spindle,
cam means for moving said finish cutting tool outwardly of said spindle against the action of said
resilient means subsequent to said approximate sizing
operation to accurately size said bore,
a plurality of honing stone assemblies carried by said
spindle,
expander cone means adapted to expand said honing
stones outwardly of said spindle upon movement
thereof in a first direction longitudinally of said
spindle,
and means interconnecting said expander cone means
and said cam means whereby movement of said expander cam means in a second direction longitudinally of said spindle will move said finish cutting
tool outwardly.

7. A cylindrical bore finishing device including
a rotatable and reciprocable tool spindle adapted for
movement within said bore,
a plurality of circumferentially spaced cutting tools
fixed to said spindle and adapted to approximately
size said bore during movement of said spindle in
a first direction longitudinally of said bore,
at least one finish cutting tool carried by said spindle
for movement therewith and radially movable relative thereto,
resilient means normally biasing said finish cutting
tool radially inwardly of said spindle,
cam means for moving said finish cutting tool outwardly of said spindle against the action of said
resilient means subsequent to said approximate sizing
operation to accurately size said bore,
a plurality of honing stone assemblies carried by said
spindle,
electroplates disposed adjacent said honing stone assemblies and carried by said spindle,
means for selectively actuating said electro-plates,
expander cone means adapted to expand said honing
stones outwardly of said spindle upon movement
thereof in a first direction longitudinally of said
spindle,
and means interconnecting said expander cone means
and said cam means whereby movement of said expander cam means in a second direction longitudinally of said spindle will move said finish cutting
tool outwardly.

8. A cylindrical bore finishing device including
a rotatable and reciprocable tool spindle adapted for
movement within said bore,
a plurality of circumferentially spaced cutting tools
fixed to said spindle and adapted to approximately
size said bore during movement of said spindle in
a first direction longitudinally of said bore,
at least one finish cutting tool carried by said spindle
for movement therewith and radially movable relative thereto,
resilient means normally biasing said finish cutting
tool radially inwardly of said spindle,
cam means for moving said finish cutting tool outwardly of said spindle against the action of said
resilient means subsequent to said approximate sizing
operation to accurately size said bore,
a plurality of honing stone assemblies carried by said
spindle,
expander cone means adapted to expand said honing
stones outwardly of said spindle upon movement
thereof in a first direction longitudinally of said
spindle,
means interconnecting said expander cam means and
said cam means whereby movement of said expander
cam means in a second direction longitudinally of
said spindle will move said finish cutting tool outwardly,
and means engageable with said finish cutting tool
upon movement thereof radially outwardly of said
spindle for locking said finish cutting tool in its
radially outward position.

9. A cylindrical bore finishing device including a rotatable and reciprocable tool spindle adapted for movement within said bore, a plurality of circumferentially spaced cutting tools fixed to said spindle and adapted to approximately size said bore during movement of said spindle in a first direction longitudinally of said bore, at least one finish cutting tool carried by said spindle for movement therewith and radially movable relative thereto, means normally biasing said finish cutting tool radially inwardly of said spindle, means for moving said finish cutting tool outwardly of said spindle against the action of said biasing means subsequent to said approximate sizing operation to accurately size said bore, a plurality of honing stone assemblies carried by said spindle, electroplates disposed adjacent said honing stone assemblies and carried by said spindle, means for selectively actuating said electroplates, expander cone means adapted to expand said honing stones outwardly of said spindle upon movement thereof in a first direction longitudinally of said spindle, and means interconnecting said expander cone means and said finish tool moving means whereby movement of said expander cone means in a second direction longitudinally of said spindle will move said finish cutting tool outwardly.

10. A cylindrical bore finishing device including
a rotatable and reciprocable tool spindle adapted for movement within said bore, a plurality of circumferentially spaced cutting tools fixed to said spindle and adapted to approximately size said bore during movement of said spindle in a first direction longitudinally of said bore, a plurality of honing stone assemblies movably carried by said spindle, electroplates disposed adjacent said honing stone assemblies and movably carried by said spindle, means for selectively actuating said electroplates, expander cone means adapted to expand said honing stones and said electroplates outwardly of said spindle upon movement thereof in one direction longitudinally of said spindle, and means normally biasing said honing stone assemblies and said electroplates inwardly of said spindle.

11. A cylindrical bore finishing device including
a rotatable and reciprocable tool spindle adapted for movement within said bore, at least one cutting tool carried by said spindle for movement therewith and radially movable relative thereto, resilient means normally biasing said finish cutting tool radially inwardly of said spindle, cam means for moving said finish cutting tool outwardly of said spindle against the action of said resilient biasing means subsequent to said approximate sizing operation to accurately size said bore, a plurality of honing stone assemblies carried by said spindle, electroplates disposed adjacent said honing stone assemblies and carried by said spindle, means for selectively actuating said electroplates, expander cone means adapted to expand said honing stones outwardly of said spindle upon movement thereof in a first direction longitudinally of said spindle, and means interconnecting said expander cone means and said cam means whereby movement of said expander cone means in a second direction longitudinally of said spindle will move said finish cutting tool outwardly.

12. A cylindrical bore finishing device including a rotatable and reciprocable tool spindle adapted for movement within a bore, a plurality of cutting tools carried by said spindle and adapted for movement therewith, at least some of said cutting tools being rough cutters adapted to size the said bore in their movement therethrough, at least one of said cutting tools being a finish cutter adapted to finish the workpiece bore to size in its movement therethrough, said finish cutter being positioned to engage the bore subsequent to engagement therewith by said rough cutters, means associated with said rough cutters and said finish cutter for moving said finish cutters radially in one direction causing engagement of said finish cutter with the bore and for moving said rough cutters radially in an opposite direction for disengaging said rough cutters from the bore whereby the workpiece bore can be finished to size by a single tool spindle.

13. A cylindrical bore finishing device including a rotatable and reciprocable tool spindle adapted for movement within the bore, a plurality of cutting tools carried by said spindle and adapted for movement therewith, at least some of said cutting tools being rough cutters spaced around the spindle periphery and adapted to size the bore in their movement therethrough, at least one of said cutting tools being a finish cutter adapted to finish the workpiece bore to size in its movement therethrough, said finish cutter being positioned to engage the bore subsequent to engagement therewith by said rough cutters, means associated with said rough cutters and said finish cutter and being selectively operable to one condition for causing said rough cutters to move radially to engage the bore and said finish cutter to be moved radially to be disengaged from the bore and to a second condition for causing said finish cutter to be moved radially to engage the bore and said rough cutters to be moved radially to be disengaged from the bore.

14. The device of claim 13 with said means being operable to a third condition in which both said rough cutters and said finish cutter are disengaged from the bore.

15. The device of claim 13 with said cutting tools including a plurality of honing stone assemblies, said means operable to a fourth condition for causing said stone assemblies to engage the bore.

16. The device of claim 15 further comprising expander cone means adapted to expand said honing stone assemblies radially outwardly of said spindle upon movement of said cone means in a given direction relative to said spindle.

17. The device of claim 16 with said given direction being along the axis of said spindle, and further comprising means for locking said finish cutter in its bore engaging position.

References Cited

UNITED STATES PATENTS 3,267,018   8/1966   Greening  ---------- 204—224
3,313,715   4/1967   Schwartz  ---------- 204—36

FOREIGN PATENTS 352,067   3/1961   Switzerland.

OTHER REFERENCES

Horgan: Article, American Machinist; vol. 106, No. 5; Mar. 5, 1962, pp. 81–82.

JOHN H. MACK, *Primary Examiner.*

W. VAN SISE, *Assistant Examiner.*